J. KINZER.
Tongs.

No. 211,855. Patented Feb. 4, 1879.

UNITED STATES PATENT OFFICE.

JACOB KINZER, OF PITTSBURG, PENNSYLVANIA.

IMPROVEMENT IN TONGS.

Specification forming part of Letters Patent No. 211,855, dated February 4, 1879; application filed November 21, 1878.

*To all whom it may concern:*

Be it known that I, JACOB KINZER, of Pittsburg, county of Allegheny, State of Pennsylvania, have invented or discovered a new and useful Improvement in Tongs; and I do hereby declare the following to be a full, clear, concise, and exact description thereof, reference being had to the accompanying drawings, making a part of this specification, in which— like letters indicating like parts—

Figure 1:
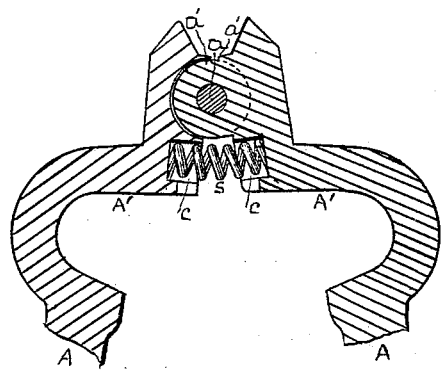
Figure 2:
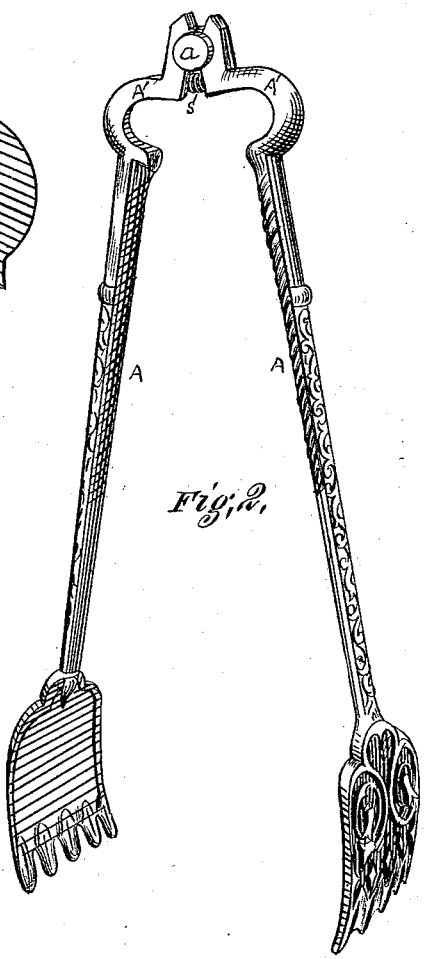

Figure 1 is a vertical sectional view of the head or upper part of a pair of tongs illustrative of my improvement; and Fig. 2 is a perspective view, drawn to a reduced scale, of a pair of tongs complete, further illustrative of the same improvement.

My improvement relates to the arrangement of a spring between the arms of a pair of tongs, near the pivot or joint, for the purpose of opening the arms.

Springs have heretofore been employed for this purpose; but they have been arranged in such way that the whole or the greater part of such spring was uncovered or exposed, and therefore not only inconvenient and unsightly, but also liable to injury.

By my improvement the spring is almost wholly covered from view, and protected from displacement or injury, and at the same time a cheap and serviceable article is secured.

In the drawings, A represents the two arms of a pair of ordinary house or coal tongs. These arms are brought together at the top, forming the head A', the two parts of which are jointed or pivoted together in the usual or any convenient way, as at $a$. On the under side, or below this joint $a$, and, by preference, near to it, or in the lower part of the head A', I make in each part or arm a socket or recess, $c$. These sockets are made on the inner or adjacent faces of the parts of the head, and opposite each other; and I prefer to make them of some considerable depth, so as to furnish a secure seat and covering for the coiled spring $s$, which is placed therein, and also provide for as great a length of spring as possible. I prefer to use a coiled spring, as shown, adapted to expand and open the tongs.

In order to prevent too great a range of motion of the arms, and thereby unseat the spring $s$, I provide projecting lips or stops $a'$, one on either arm, above the joint $a$. These lips or stops, bearing against each other or against the opposite arm or part of the head, will limit the opening of the arms as desired.

I do not limit myself to the particular location shown for the sockets $c$, as the location may be varied somewhat and still come within my invention.

I claim as my invention—

1. A pair of tongs having an expansion-spring arranged in recesses made in the adjacent faces of the arms below the joint or pivot, substantially as set forth.

2. In a pair of tongs, the combination of a spring, $s$, seated in recesses $c$ on one side of the joint or pivot, and stops $a'$, arranged on the other side of the joint or pivot, for limiting the motion of the arms on such pivot, substantially as set forth.

In testimony whereof I have hereunto set my hand.

JACOB KINZER.

Witnesses:
J. J McCORMICK,
CLAUDIUS L. PARKER.